United States Patent
Bowen

(10) Patent No.: US 7,841,640 B2
(45) Date of Patent: Nov. 30, 2010

(54) REST

(75) Inventor: George Bowen, Nantwich (GB)

(73) Assignee: Bentley Motors Limited (GB)

( * ) Notice: Subject to any disclaimer, the term of this patent is extended or adjusted under 35 U.S.C. 154(b) by 194 days.

(21) Appl. No.: 10/588,805

(22) PCT Filed: Feb. 3, 2005

(86) PCT No.: PCT/GB2005/000371

§ 371 (c)(1),
(2), (4) Date: Jan. 25, 2008

(87) PCT Pub. No.: WO2005/077709

PCT Pub. Date: Aug. 25, 2005

(65) Prior Publication Data

US 2008/0143137 A1    Jun. 19, 2008

(30) Foreign Application Priority Data

Feb. 7, 2004    (GB)    ................. 0402720.7

(51) Int. Cl.
*B60N 3/06*    (2006.01)
(52) U.S. Cl. .................... 296/75; 296/37.14
(58) Field of Classification Search ............. 296/37.14, 296/24.34, 75; 297/423.24, 423.25, 423.27, 297/423.29, 423.3, 423.44, 423.46
See application file for complete search history.

(56) References Cited

U.S. PATENT DOCUMENTS

| | | | | |
|---|---|---|---|---|
| 1,544,258 A * | 6/1925 | McMaster | .................... | 296/75 |
| 4,275,914 A * | 6/1981 | Holweg et al. | ............. | 296/68.1 |
| 5,183,308 A * | 2/1993 | Koga et al. | .................... | 296/75 |
| 5,584,535 A * | 12/1996 | Jacobson et al. | ....... | 297/423.46 |
| 5,951,084 A | 9/1999 | Okazaki et al. | | |
| 6,131,485 A * | 10/2000 | Raja | ............................ | 74/562 |
| 6,135,529 A | 10/2000 | DeAngelis et al. | | |
| 6,203,088 B1 | 3/2001 | Fernandez et al. | | |
| 6,527,327 B2 * | 3/2003 | Gaus et al. | ..................... | 296/75 |
| 7,234,746 B2 * | 6/2007 | Sakakibara et al. | ...... | 296/24.34 |
| 7,343,830 B2 * | 3/2008 | Rinero et al. | ................. | 74/512 |
| 2001/0030436 A1 | 10/2001 | Kifer et al. | | |
| 2003/0127882 A1 * | 7/2003 | Sauvonnet et al. | ............ | 296/75 |
| 2007/0205626 A1 * | 9/2007 | Ohtsubo et al. | ............... | 296/75 |
| 2008/0061577 A1 * | 3/2008 | Downey | .................. | 296/37.14 |

FOREIGN PATENT DOCUMENTS

| | | |
|---|---|---|
| DE | 29819544 | 2/1999 |
| DE | 10047740 | 6/2002 |

(Continued)

*Primary Examiner*—Jason S Morrow
(74) *Attorney, Agent, or Firm*—Salter & Michaelson

(57) ABSTRACT

A rest for a vehicle for supporting the feet and/or legs of a passenger comprising a housing (2) having an electrically powered pivotal lid (3) and defining a storage. The lid may be pivoted between an open position in which access to the storage is permitted and support provided for the feet and/or calves of the passenger and a closed position. The rest is mounted for movement in a passenger footwell on a pair of rails and a motorised pinion (11) runs on a rack (10) to move the rest up and down the rails (9). The arrangement provides a comfortable adjustable leg/foot support which is especially beneficial on long journeys. At same time accessible and convenient extra storage is provided.

11 Claims, 5 Drawing Sheets

FOREIGN PATENT DOCUMENTS

| | | |
|---|---|---|
| EP | 1 116 654 | 7/2001 |
| EP | 1 179 449 | 2/2002 |
| EP | 1 197 382 | 4/2002 |
| JP | 4-60726 | 5/1992 |
| WO | WO 02/096712 | 12/2002 |

\* cited by examiner

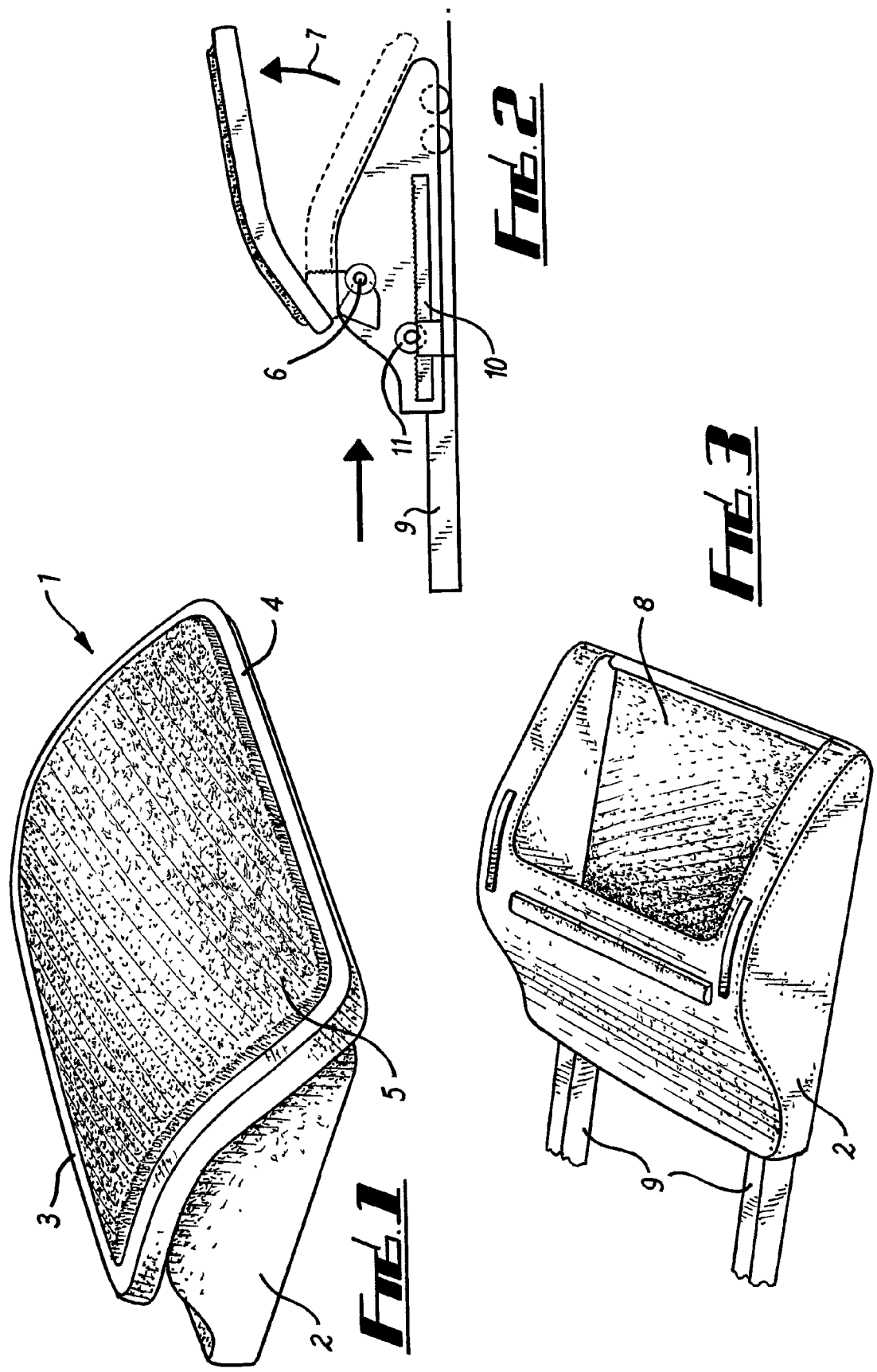

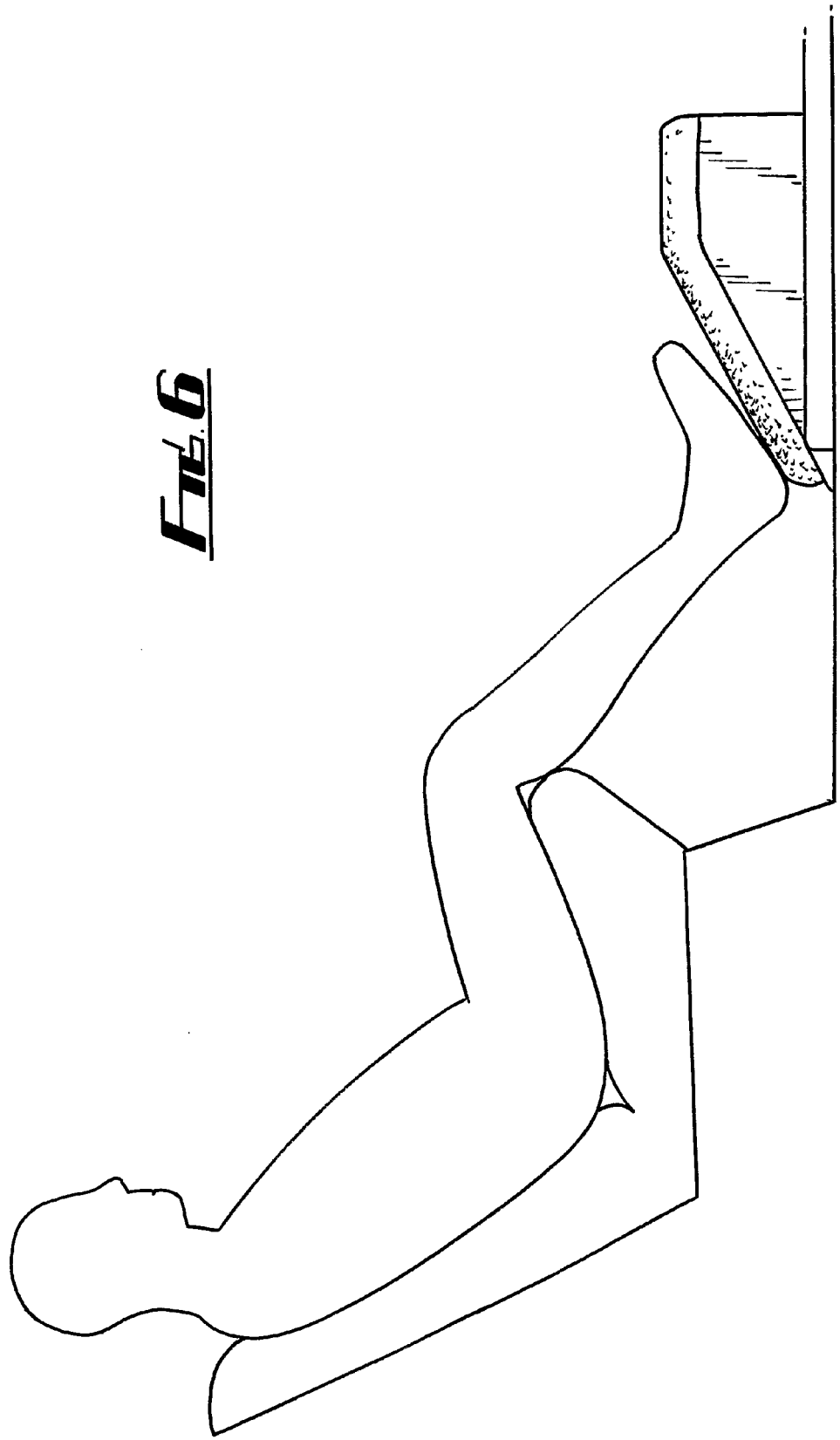

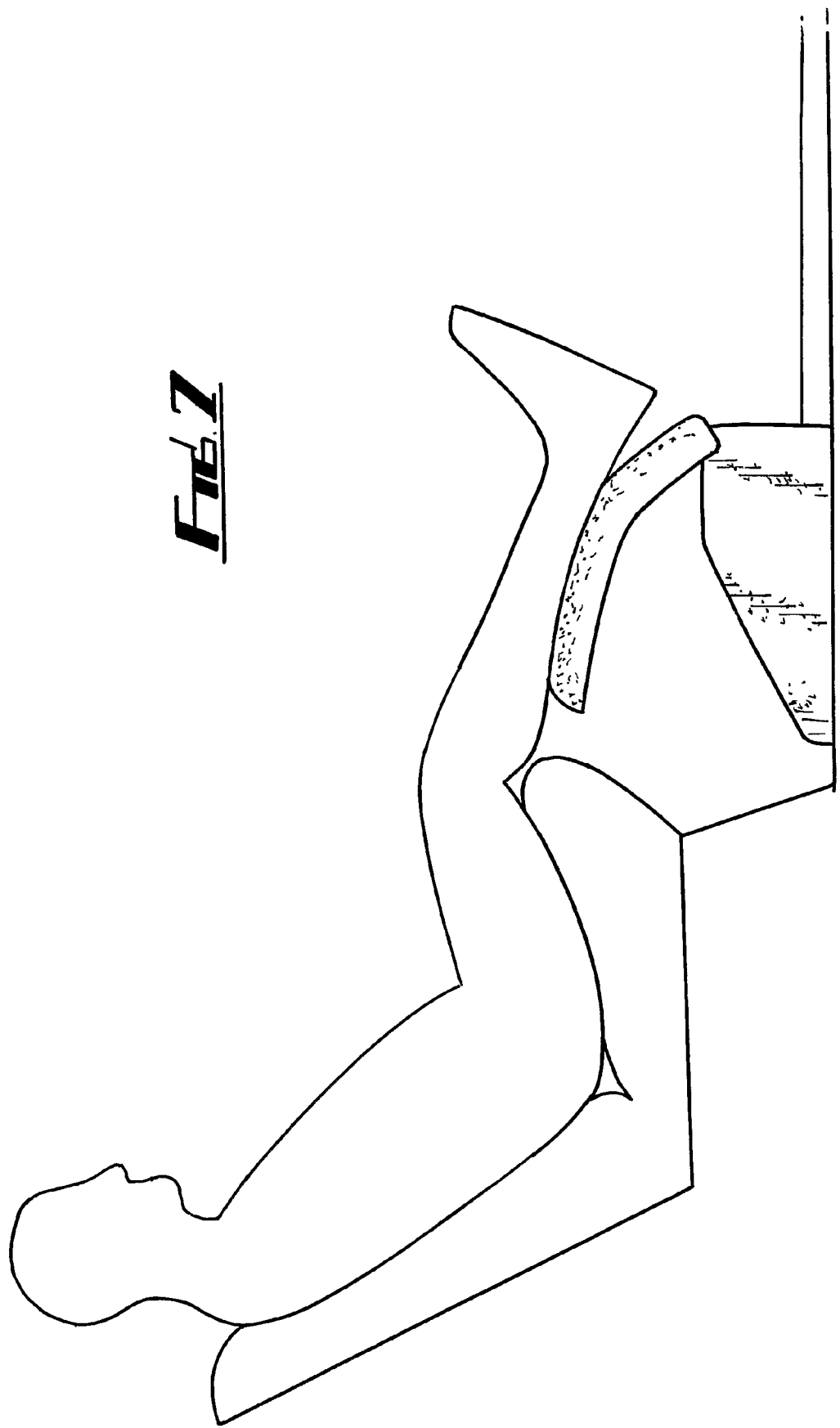

REST

TECHNICAL FIELD

The present invention relates to a rest, particularly, but not exclusively a rest for a vehicle.

BACKGROUND OF THE INVENTION

In vehicles, particularly on long journeys, comfort is especially important. Supporting the feet and/or legs can increase comfort. It is an object of the invention to provide such support and thereof alleviate any discomfort which may otherwise be experienced.

SUMMARY OF THE INVENTION

According to one aspect of the present invention there is provided a rest for use in a vehicle comprising a housing having a sloping upper face and means for adjusting the position of the housing relative to the vehicle.

According to another aspect of the present invention there is provided a vehicle having a rest disposed in a footwell of the vehicle, the rest comprising a housing having a sloping upper face and means for adjusting the position of the housing relative to the vehicle.

In a preferred embodiment of the invention, the housing defines a storage space and the sloping upper face is provided by a pivotal lid which closes off the storage space but which may be pivoted to the open position to allow access thereto. The lid may be powered. The means for adjusting the position of the housing relative to the vehicle comprises a motorized rack and pinion arrangement operative to move the housing on a pair of rails affixed to the floor of the vehicle. Preferably the driving motors are electric although other forms of motor may be used. Advantageously, the sloping upper face may be provided with a layer of wear resistant material such as carpet matching the carpet of the vehicle.

DESCRIPTION OF THE DRAWINGS

In order that the invention may be more clearly understood, one embodiment thereof will now be described, by way of example, with reference to the accompanying drawings in which:—

FIG. 1 shows a perspective view of a rest according to the invention,

FIG. 2 a cross sectional view, in an open position and to a smaller scale, of the rest of FIG. 1

FIG. 3 shows a further perspective view of the rest of FIG. 1 with the lid removed.

FIG. 6 shows the rest of FIGS. 1 to 5 in use in one operative position and

FIG. 7 shows a view similar to FIG. 6 but with the rest in another operative position.

DETAILED DESCRIPTION

Figure 4:
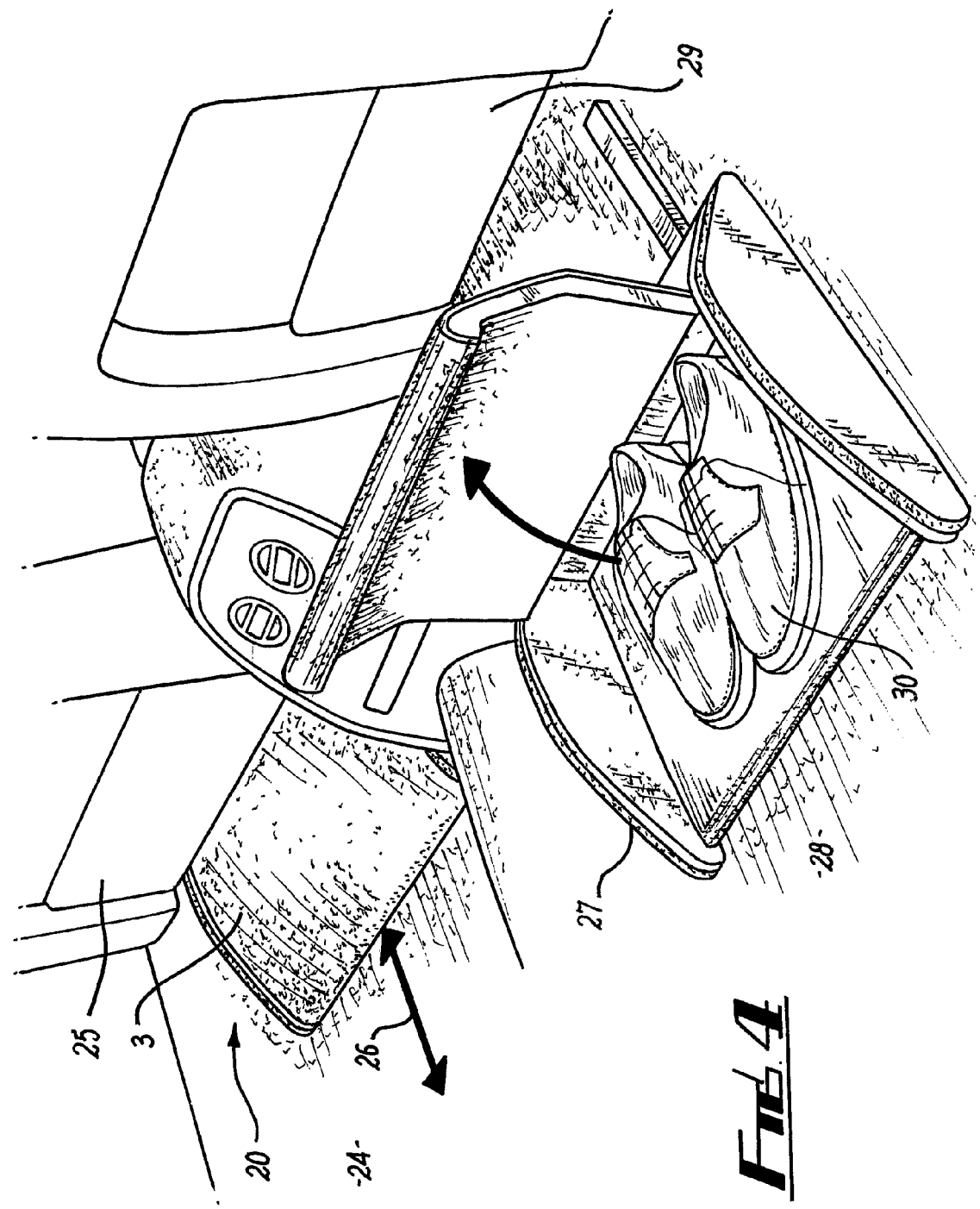
FIG. 4 shows a perspective view of the rest of FIGS. 1 to 3 in use in a vehicle
Figure 5:
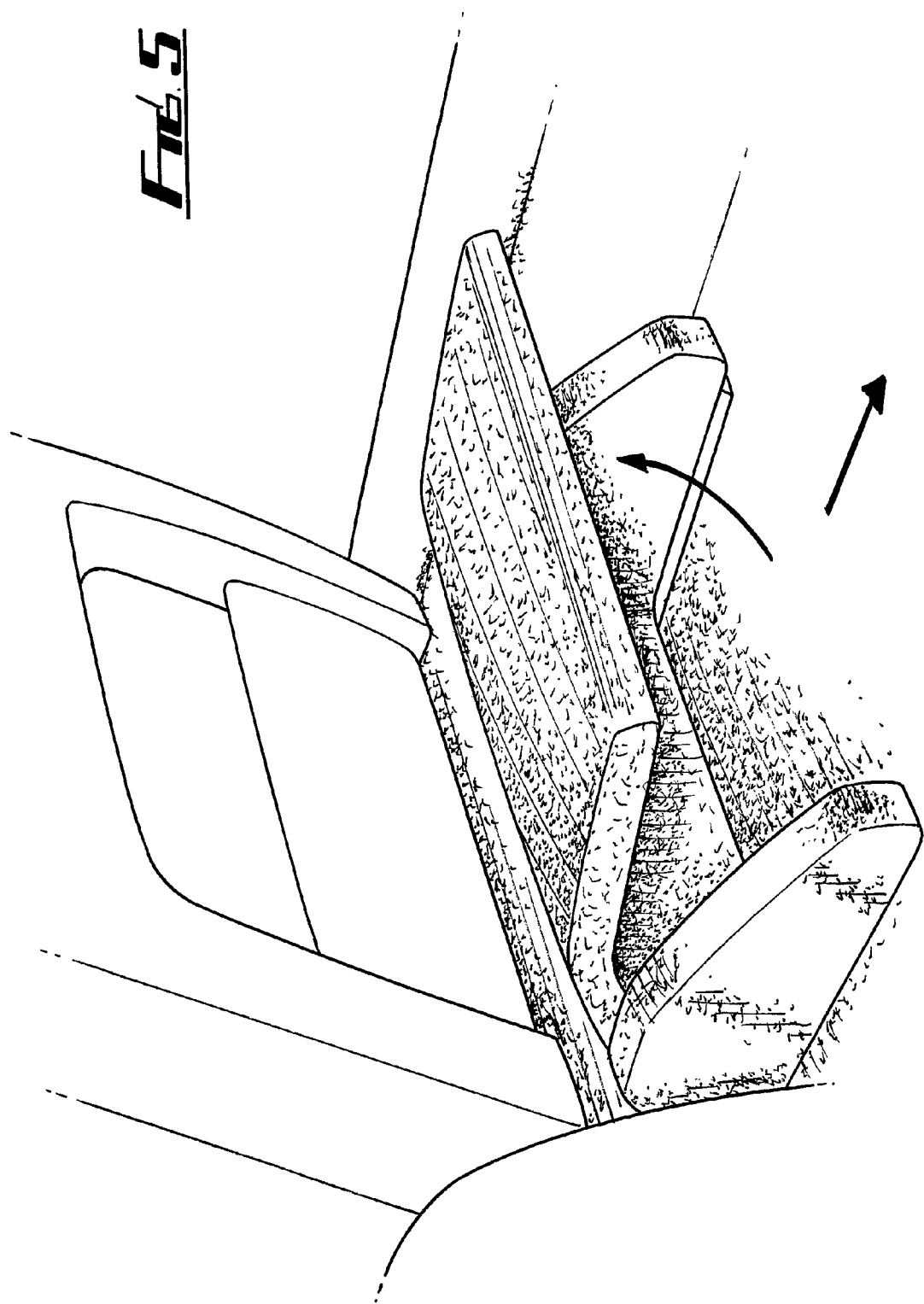
FIG. 5 shows a further perspective view of the rest of FIGS. 1 to 3 in a different operational position.

Referring to FIGS. 1 to 3, the rest 1 comprises a housing 2 surmounted by an electrically powered lid 3. The lid 2 has an angled form of shallow inverted V-shaped cross-section providing a sloping upper face 4. A layer 5 of a wear resistant material, such as carpet preferably matching the carpet of the vehicle in which the rest is fitted, is affixed to this sloping upper face 4. Referring particularly to FIG. 2, the lid 3 is pivotally mounted at 6 on the housing 2 for electrically powered movement in the direction of arrow 7 between the open position shown and the closed position shown in FIG. 1 and in shadow outline in FIG. 2. With the lid in the open position access is permitted to an enclosure defined by the housing 2. The housing comprises a base 8 to support items stored. The base is also carpeted.

The rest is mounted for movement on a pair of parallel rails 9. A rack 10 is connected to one of the rails and a motorized pinion 11 runs on the rack 10. The motor (not shown) driving the pinion 11 is preferably electrical but other types of motor may be used. Operation of the pinion 11 on the rack moves the rest up and down the rails 9 in the longitudinal direction of the rails 9.

Referring to FIG. 4, two rests as shown in FIGS. 1 to 3 are shown in position in a vehicle. One rest 26 is shown with the lid 3 in the closed position in one of the rear footwells 24 of a motor car and against the base of the corresponding front seat 25. In this position the rest may be used as a footrest as shown for example is FIG. 6. The position of the footrest may be altered to suit by the passenger in the direction shown by the arrow 26. The other footrest 27 is shown with the lid 3 in the open position permitting items, in this case a pair of shoes 30, to be stored, in the footwell 28 against the base of the other front seat 29. The rest 27 is also shown in a more rearwardly adjusted position. In this position the rest 27 may provide support for the calves as shown, for example, in FIG. 7.

The above described arrangement provides a comfortable adjustable leg/foot support which is especially beneficial on long journeys. At the same time accessible and convenient extra storage is also provided.

It will be appreciated that the above embodiment has been described by way of example only and that many variations are possible without departing from the scope of the invention.

The invention claimed is:

1. A rest for use in a vehicle adjacent a seat of the vehicle, the rest comprising:
    a housing;
    said housing including a base that at least in part defines an internal storage space for the support of items in the storage space and on the base;
    said housing constructed and arranged to support the base of the housing so that the position of the housing is adjustable between a position closer to the seat and a position farther from the seat;
    a lid mounted over the housing:
    a pivot for the lid to provide two different pivot positions of the lid including a closed position and an open position thereof;
    said lid having first and second contiguous, but differently sloping top face surfaces including a first surface and a second surface;
    said pivotally mounted lid in the closed position thereof enabling the foot of the user to rest on the first surface, and in the open position thereof allowing access to the storage space while at the same time enabling the calf of the user to rest on the first surface.

2. A rest for use in a vehicle as claimed in claim 1 in which a layer of wear resistant material is provided on the first and second surfaces.

3. A rest for use in a vehicle as claimed in claim 1, wherein the second surface is closer to the pivot than the first surface.

4. A rest for use in a vehicle as claimed in claim 3, wherein the first surface has a free end directed toward the user.

5. A rest for use in a vehicle as claimed in claim 2, in which the layer of wear resistant material is carpet.

6. A rest for use in a vehicle as claimed in claim 1 wherein the lid has an angled cross-section.

7. A rest for use in a vehicle as claimed in claim 1 wherein the first and second surfaces of the lid are substantially each planar and defined by an angled inverse V-shaped cross-section in which the angle between the surfaces is an obtuse angle.

8. A rest for use in a vehicle as claimed in claim 1 including a rack and pinion arrangement for adjusting the position of the housing relative to the vehicle.

9. A rest for use in a vehicle as claimed in claim 8 in which the rack and pinion arrangement is operative to move the housing on a pair of rails adapted to be fixed to the floor of the vehicle.

10. A rest for use in a vehicle as claimed in claim 1 wherein the base of the housing is constructed and arranged with rails that enable the base to move close to or farther from the seat.

11. A rest for use in a vehicle as claimed in claim 1 wherein only the first surface is a rest surface.

* * * * *